United States Patent [19]

Chang

[11] Patent Number: 5,251,466
[45] Date of Patent: Oct. 12, 1993

[54] LOCK ASSEMBLY FOR GEAR SHIFTER

[76] Inventor: Chao-Sheng Chang, No. 57, Sec. 3, Chung Yang Rd., San Chung City, Taipei Hsien, Taiwan

[21] Appl. No.: 16,526

[22] Filed: Feb. 11, 1993

[51] Int. Cl.⁵ .............................................. B60R 25/06
[52] U.S. Cl. ........................................ 70/247; 70/248; 70/257; 74/89.13; 74/424.8 B
[58] Field of Search .................... 70/237, 245–251, 70/256, 257; 74/89.13, 424.88

[56] References Cited

U.S. PATENT DOCUMENTS

| | | | |
|---|---|---|---|
| 1,362,685 | 12/1920 | Farah | 70/251 |
| 1,778,294 | 10/1930 | Kennedy | 70/248 |
| 3,647,243 | 3/1972 | Nagy et al. | 70/237 X |
| 3,977,488 | 8/1976 | Kameyama | 70/248 X |
| 4,912,949 | 4/1990 | Bowers | 70/19 |
| 5,016,454 | 5/1991 | Al-Sheikh | 70/247 X |
| 5,085,061 | 2/1992 | Maudsley | 70/257 X |

*Primary Examiner*—Lloyd A. Gall
*Attorney, Agent, or Firm*—Bacon & Thomas

[57] ABSTRACT

A lock assembly for a gear shifter of a vehicle includes a base plate mounted to a floor of the vehicle adjacent to the gear shifter, a base frame mounted on the base plate, and a motor mounted on the base frame and having an output bevel gear. A pair of mount plates are spaced on the base frame. A hollow holder is movably mounted on two guiding bars which parallelly extend between the mount plates. A holder block is provided inside the hollow holder. A guiding sleeve mounted on the base plate receives a screw therein. An end of the screw extends out of the guiding sleeve and engages with a holder for securely holding the gear shifter and for moving therewith. A screw member is rotatably mounted in one of the mount plates. The screw member includes a bevel gear end which meshes with the bevel gear of the motor, a right hand thread portion which engages with the hollow holder, and a left hand thread portion which engages with the holder block. A housing is provided to enclose the lock assembly and has an opening through which the gear shifter passes. The screw is locked between the hollow holder and the holder block when the motor is activated to turn in one direction. The screw is unlocked when the motor is activated to turn in another direction.

5 Claims, 7 Drawing Sheets

LOCK ASSEMBLY FOR GEAR SHIFTER

BACKGROUND OF THE INVENTION

The present invention relates to a lock assembly for a vehicle and, more particularly, to a lock assembly for the gear shifter of a vehicle.

To prevent theft of vehicles, different types of locks are used to lock, e.g., the steering wheel and/or the braking pedal and the gear shifter. Conventional locks used in vehicles are, however, cumbersome to operate and sometimes tend to be disabled as they are accessible. Therefore, the present invention provides a hidden-type lock assembly for the gear shifter to mitigate and/or obviate the above-mentioned problems.

SUMMARY OF THE INVENTION

A lock assembly for a gear shifter of a vehicle in accordance with the present invention includes a base frame mounted to a floor of the vehicle adjacent to the gear shifter, a pair of mount plates spaced on the base frame, a guiding bar means extending between the mount plates, and a hollow holder mounted on and movable along the guiding bar means. A holder block is provided inside the hollow holder.

A guiding sleeve is mounted on the base plate for receiving a screw therein. An end of the screw extends out of the guiding sleeve and engages with a holder means for securely holding the gear shifter and for moving therewith. A jointing means is mounted between the screw and the holder means for converting a non-linear motion of the gear shifter to a linear motion of the screw in the guiding sleeve.

A housing encloses the lock assembly and has an opening through which the gear shifter passes and allows the gear shifter to perform its function. A screw member is rotatably mounted in one of the mount plates. The screw member includes a right hand thread portion which engages with one of the hollow holder and the holder block. The screw member further has a left hand thread portion which engages with the remaining of the hollow holder and the holder block.

A driving means is provided to drive the screw member, and an activating means is provided to activate the driving means. By such an arrangement, the screw is locked between the hollow holder and the holder block when the driving means is activated by the activating means to turn in one direction, thereby locking the gear shifter. The screw together with the gear shifter are unlocked when the driving means is activated by the activating means to turn in another direction.

In accordance with one aspect of the invention, a means is provided to cut the power supply to the driving means when the gear shifter reaches a pre-determined status.

In accordance with another aspect of the invention, the activating means includes a first button to activate the driving means to turn in the direction and a second button to activate the driving means to turn in another direction.

In accordance with a further aspect of the invention, the driving means is a motor with a bevel gear for meshing with a second bevel gear on the screw member.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
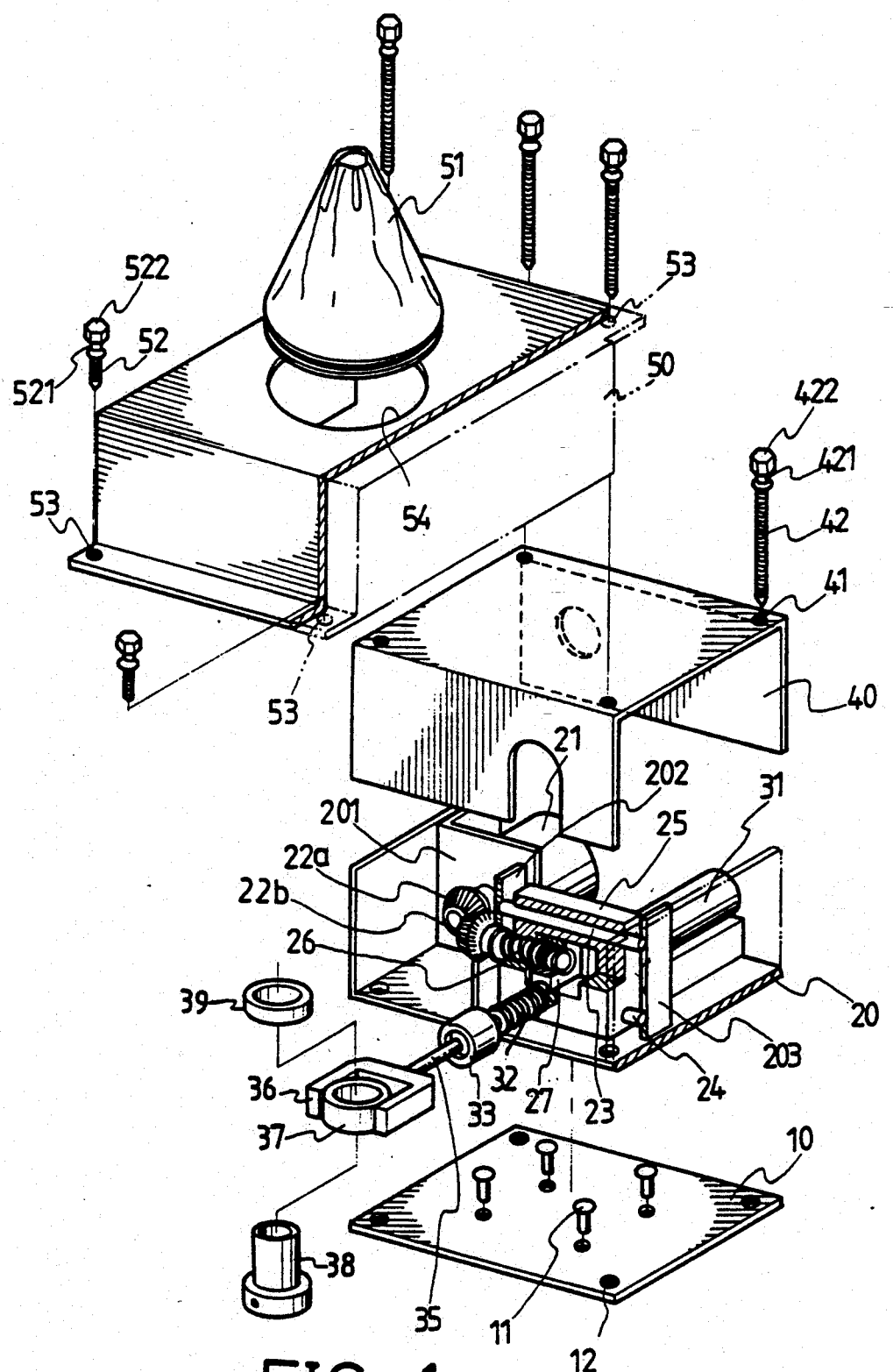
FIG. 1 is an exploded view of a hidden-type lock assembly for the gear shifter of a vehicle in accordance with the present invention.
Figure 2:
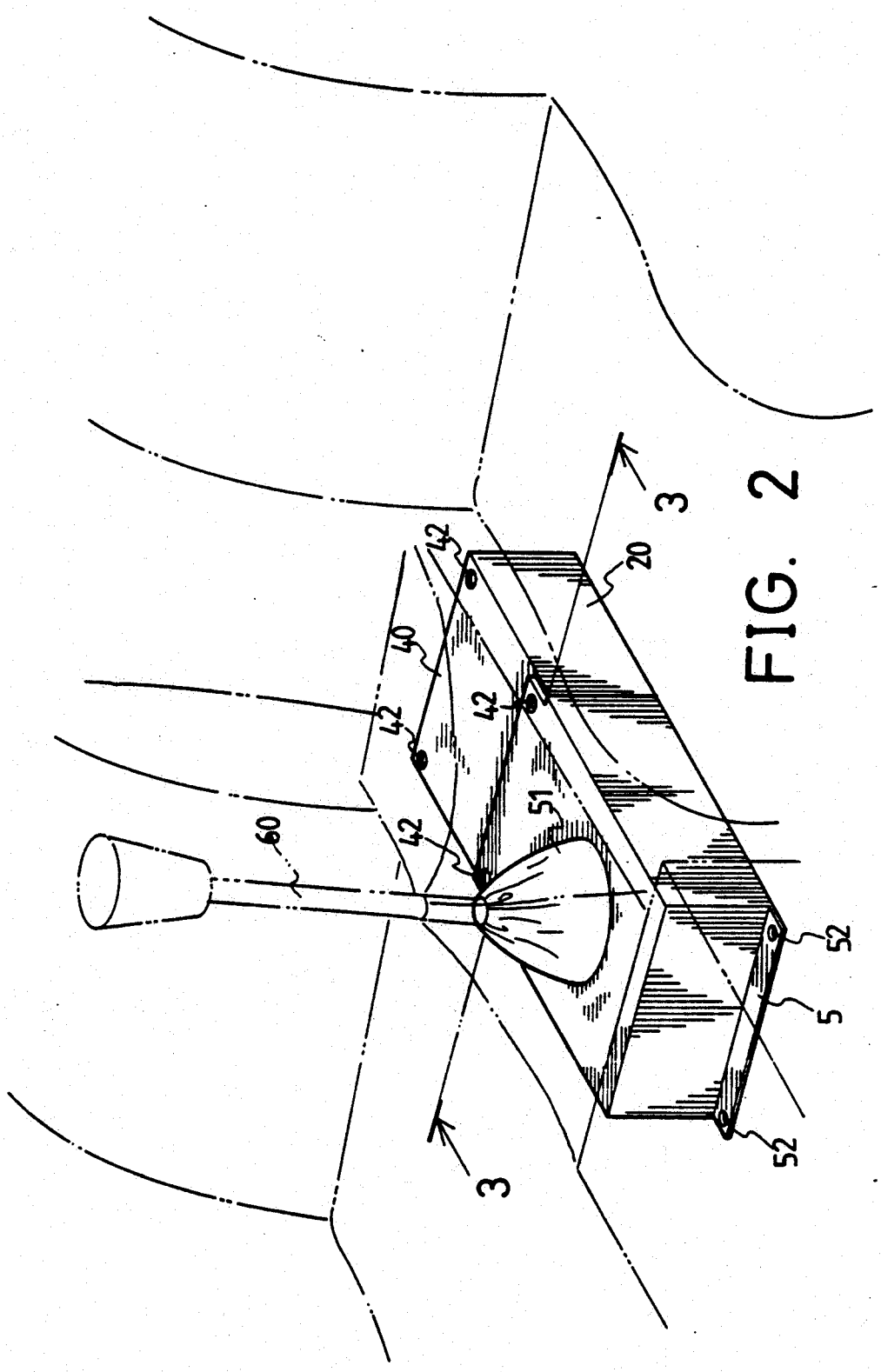
FIG. 2 is a schematic view showing an appearance of the hidden-type lock assembly of the present invention.

Referring to FIGS. 1 and 2 of the drawings, a hidden-type lock assembly for the gear shifter 60 of a vehicle in accordance with the present invention comprises a base plate 10 mounted by rivets 11 to a floor of the vehicle adjacent to the gear shifter 60, a base frame 20 mounted on the base plate 10, a lock means mounted on the base frame 20, a first housing 40 for shielding most part of the lock means, and a second housing 50 for shielding the remaining part of the lock means and the gear shifter 60. The second housing 50 has an opening 54 through which the gear shifter 60 passes to allow the gear shifter 60 to perform its function. A conventional cover 51 of leather is provided to shield the opening to prevent undesired articles from entering the housing.

Figure 6:
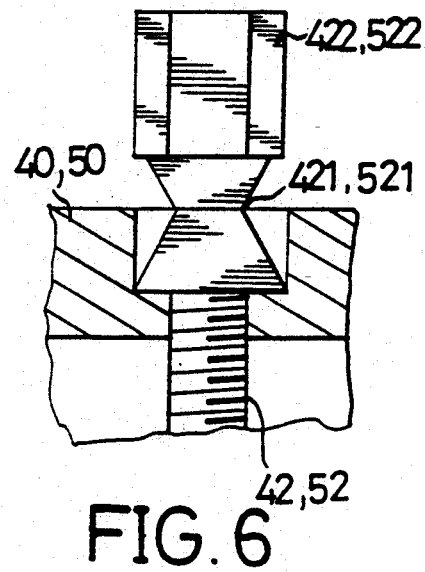
FIG. 6 is a partial cross-sectional view showing the bolts after assembling.
Figure 7:
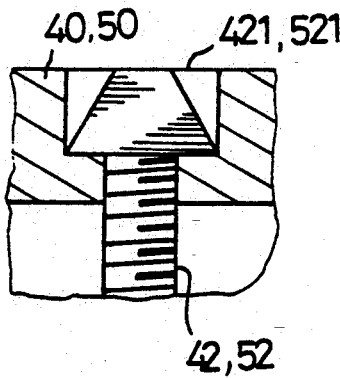
FIG. 7 is a view similar to FIG. 6 in which the head of the bolt is hammered out.

As shown in FIG. 2, part of the second housing 50 overlays on part of the first housing 40. It is appreciated that the first housing 40 may be integral with the second housing 50. The lock assembly is mounted by passing long bolts 42 and short bolts 52 through corresponding holes 41, 53, and 12. As shown in FIGS. 6 and 7, after assembling, the bolt head 422, 522 are hammered out from a neck 421, 521 thereof, thereby preventing from burglary.

The lock means is described as follows. A motor 21 is mounted on the base frame 20 and has an output bevel gear 22a. A pair of mount plates 202 and 203 are spaced on the base frame 20. A hollow holder 25 is movably mounted on two guiding bars 23 and 24 which parallelly extend between the mount plates 202 and 203. A holder block 27 is provided inside the hollow holder 25 which will be discussed in detail later.

A guiding sleeve 31 is mounted on the base frame 20 for receiving a screw 32 therein. An end of the screw 32 extends out of the guiding sleeve 31 and engages with a shifter holder means by a socket 33 and ball 34 joint (see FIG. 5). The shifter holder means includes a linking rod 35, a U-shaped member 36 with a ring 37 secured therein, a lower socket 38, and an upper socket 39 for securely holding the gear shifter 60 and for moving therewith, without affecting the function of the gear shifter 60 (see FIG. 5). The socket and ball joint converts nonlinear motion of the gear shifter 60 into a linear motion along the axis of the screw 32 in the guiding sleeve 31. It is appreciated that the socket and ball joint can be replaced by other suitable joints.

A screw member 26 is rotatably mounted in mount plate 202. The screw member 26 includes a bevel gear end 22b for meshing with the bevel gear 22a of the motor 21, a right hand thread portion 26a engaging with the hollow holder 25, and a left hand thread portion 26b engaging with the holder block 27.

Figure 4:
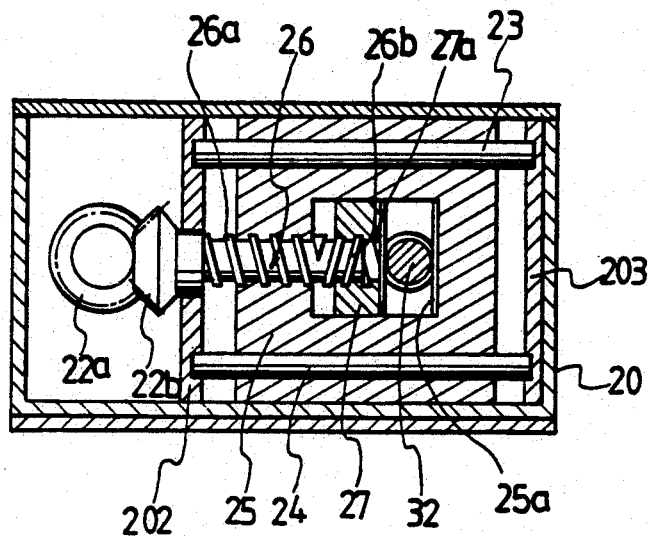
FIG. 4 is a view similar to FIG. 3 in which the lock assembly is in a locked position.
Figure 3:
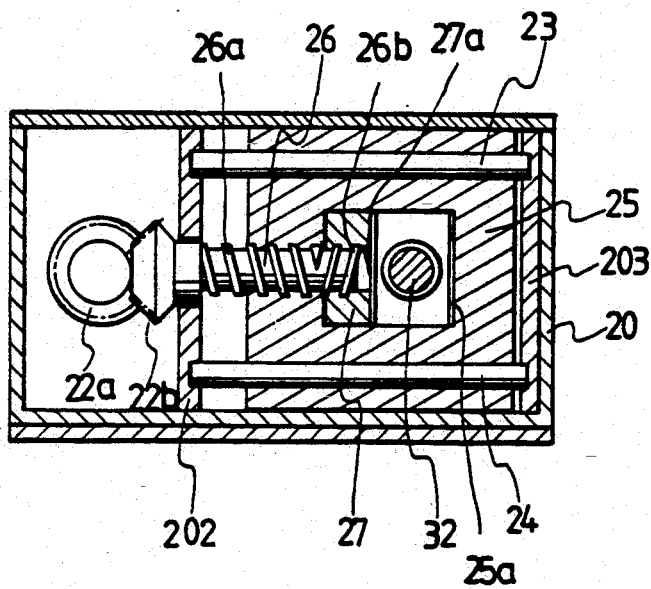
FIG. 3 is a schematic cross-sectional view taken along line 3—3 in FIG. 2 in which the lock assembly is in an unlocked position.
Figure 5:
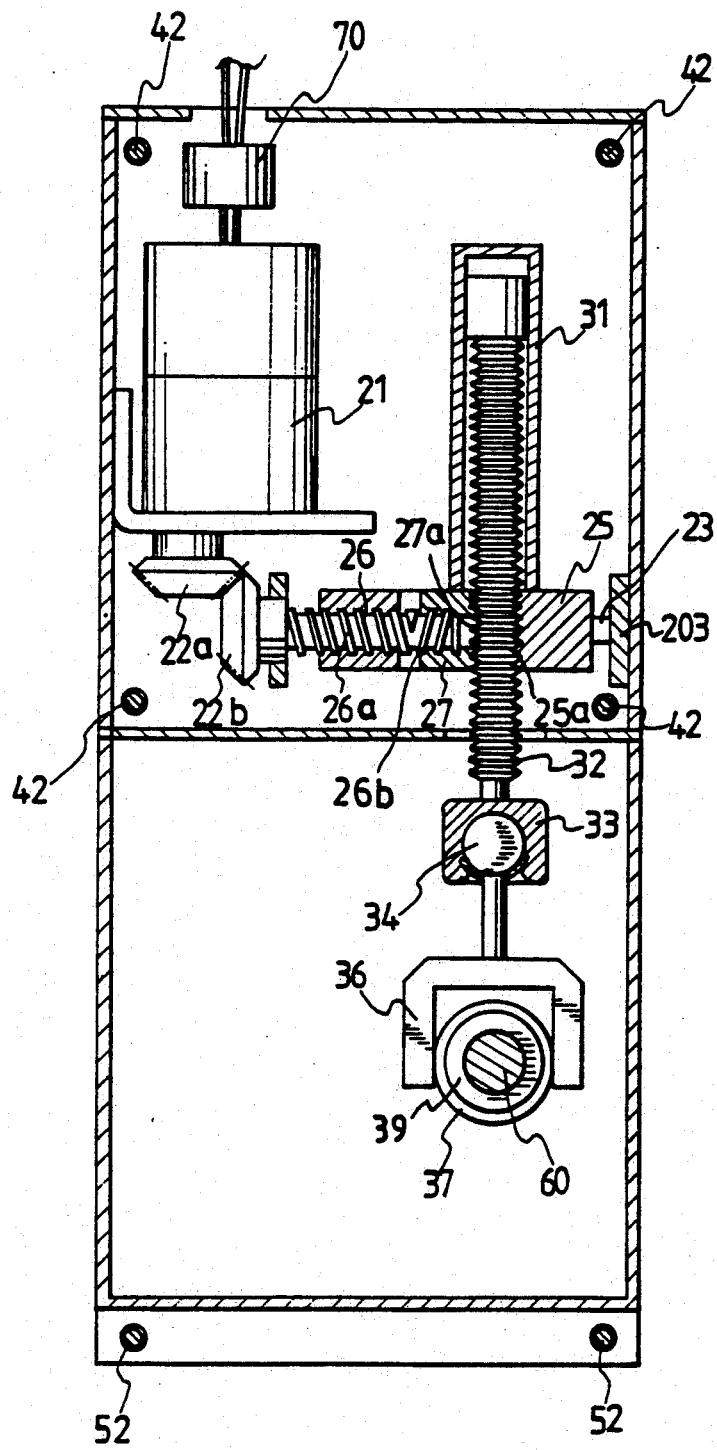
FIG. 5 is a top plan view, partly-sectioned, of the lock assembly.

The screw 32 in FIG. 3 is not locked. When the vehicle is not in use, the user may activate the motor to turn in one direction such that the holder block 27 moves rightward along the guiding bars 23 and 24 and the hollow holder 25 moves leftward until the screw 32 is held between the holding surface 25a of the hollow holder 25 and the holding surface 27a of the holder block 27, as shown in FIGS. 4 and 5, thereby locking the screw, i.e., the gear shifter 60. Unlocking of the gear shifter 60, i.e., the screw 32 may be achieved by activating the motor 21 to turn in another direction.

Figure 8:
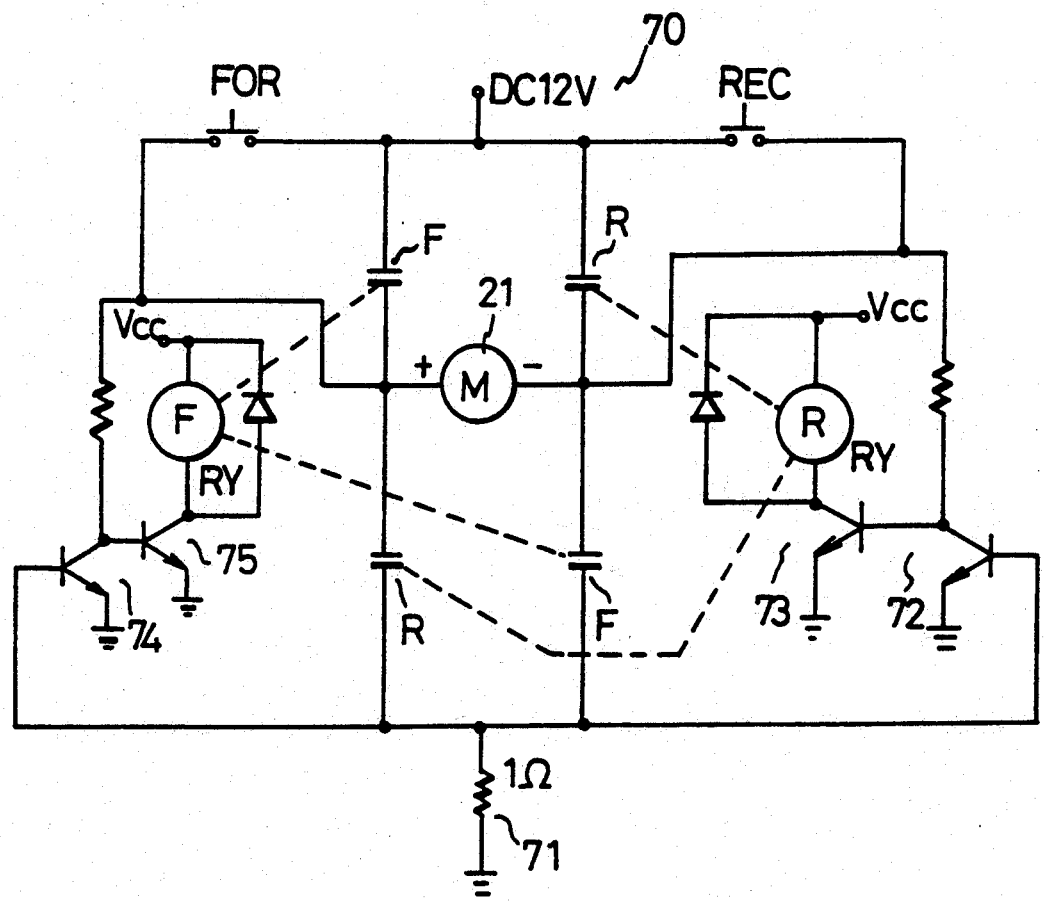
FIG. 8 is a button-activated electric circuit in accordance with the present invention.

Now referring to FIG. 8, when the automobile is not in use, the user may push a "FOR" button to trigger a transistor 75 which, in turn, activates the motor 21 via a forward relay F. After the gear shifter 60 is locked, the motor 21 generates a current greater than the previously prevailing current as a result of the mechanical resistance which the motor 21 encounters from the gear shifter 60, thus causing an increase in the end voltage of the inductive resistor 71 and therefore, the activation of transistor 74, hence voltage which was applied to the base of transistor 75 is now grounded off via transistor 74 to the ground, and transistor 75 becomes inactivated. Therefore, the power supply to the motor 21 is cut off.

As to the unlocking of the gear shifter 60, the user may push a "REC" button to trigger transistor 73 which, in turn, allows a current to flow through the motor 21 via a reverse relay R. After the gear shifter 60 is completely released, the motor 21 generates a great current to trigger transistor 72, thus the voltage which was previously applied to the base of transistor 73 is grounded off, and transistor 73 becomes inactivated. Again, the power supply to the motor 21 is cut off.

Figure 9:
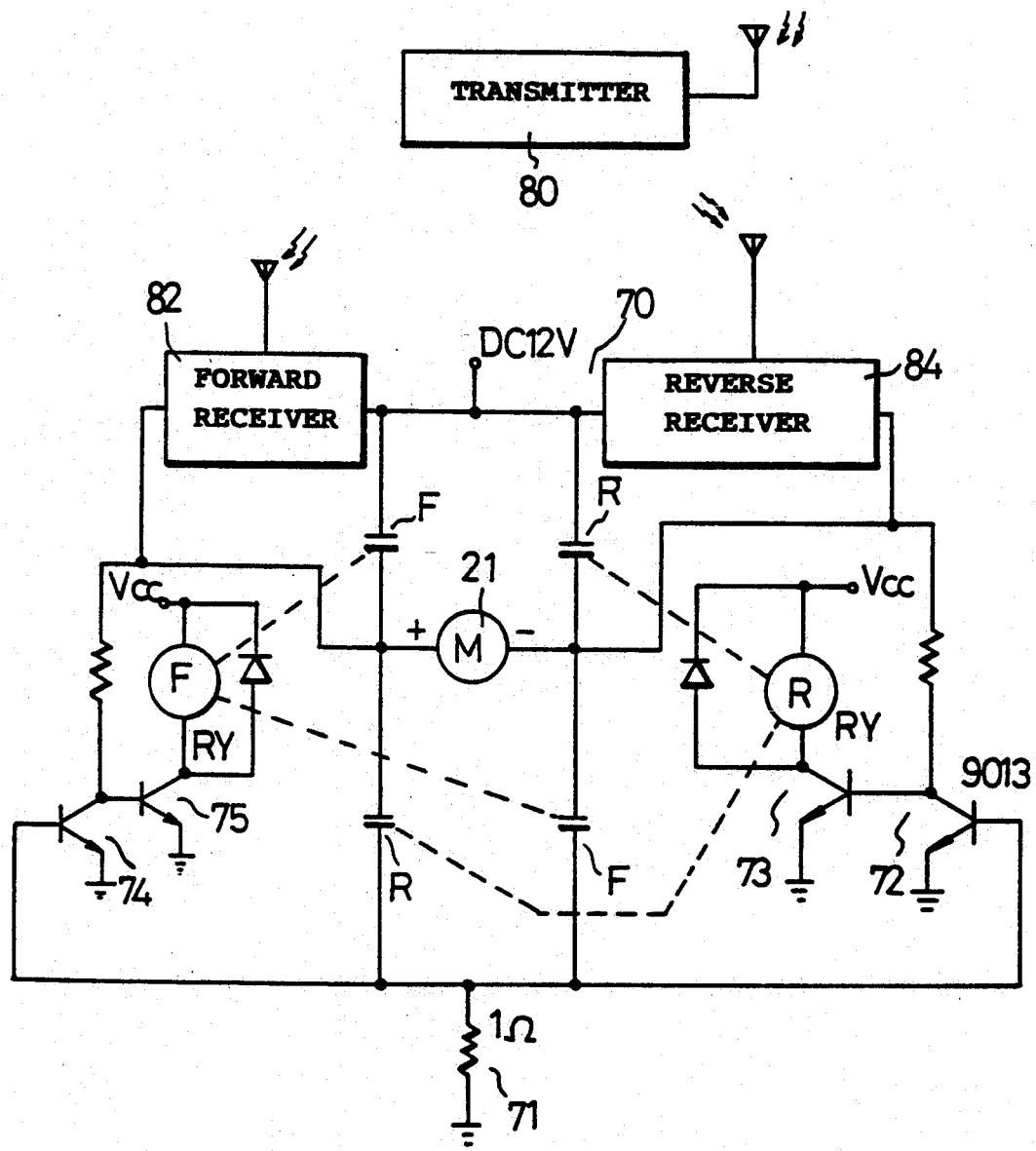
FIG. 9 is a transmitter-activated electric circuit in accordance with the present invention.

In operation, a user may use a remote transmitter instead of push buttons ("FOR" and "REC" in the above example) installed in hidden place in an automobile equipped with the lock for the gear shifter. As shown in FIG. 9, to lock the gear shifter 60, the user may press a key or button on the transmitter 80 to activate the forward receiver 82 which acts as the "FOR" button in the above embodiment. To unlock the gear shifter 60, the user may press another key or button on the transmitter 80 to activate the reverse receiver 84 which acts as the "REC" button in the above embodiment. It is appreciated that the electric circuit merely illustrates a possible method for controlling the power supply to the motor. Other electric circuits may be used to achieve the same function without departing from the scope of the invention.

Although the invention has been explained in relation to its preferred embodiment, it is to be understood that many other possible modifications and variations can be made without departing from the spirit and scope of the invention as hereinafter claimed.

I claim:

1. A lock assembly for a gear shifter of a vehicle comprising:
    a base frame mounted to a floor of the vehicle adjacent to the gear shifter;
    a pair of mount plates being spaced on said base frame, a guiding bar means extending between said mount plates, a hollow holder being mounted on and movable along said guiding bar means, a holder block being provided inside said hollow holder;
    a guiding sleeve mounted on said base frame for receiving a screw therein, an end of said screw extending out of said guiding sleeve and cooperating with a holder means for securely holding said gear shifter and for moving therewith;
    a jointing means mounted between said screw and said holder means for converting a non-linear motion of the gear shifter to a linear motion of said screw in said guiding sleeve;
    a housing enclosing said lock assembly, said housing having an opening through which the gear shifter passes and allowing the gear shifter to perform its function;
    a screw member rotatably mounted in one of said mount plates, said screw member comprising a right hand thread portion which engages with one of said hollow holder and said holder block and a left hand thread portion which engages with the remaining of said hollow holder and said holder block;
    a driving means for driving said screw member; and means for activating said driving means;
    whereby said screw is locked between said hollow holder and said holder block when said driving means is activated by said activating means to turn in one direction, and said screw is unlocked when said driving means is activated by said activating means to turn in another direction.

2. The lock assembly as claimed in claim 1 further comprising means for cutting power supply to said driving means when the gear shifter reaches a pre-determined status.

3. The lock assembly as claimed in claim 2 wherein said activating means includes a first button to activate said driving means to turn in said one direction and a second button to activate said driving means to turn in said another direction.

4. The lock assembly as claimed in claim 2 wherein said activating means is a transmitter.

5. The lock assembly as claimed in claim 1 wherein said driving means is a motor with a bevel gear for meshing with a second bevel gear on said screw member.

* * * * *